(12) United States Patent
Voliter

(10) Patent No.: US 11,314,400 B2
(45) Date of Patent: Apr. 26, 2022

(54) UNIFIED DIGITAL CONTENT SELECTION SYSTEM FOR VECTOR AND RASTER GRAPHICS

(71) Applicant: Adobe Inc., San Jose, CA (US)

(72) Inventor: Robert Tyler Voliter, Brisbane, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/379,252

(22) Filed: Apr. 9, 2019

(65) Prior Publication Data

US 2020/0117347 A1    Apr. 16, 2020

Related U.S. Application Data

(60) Provisional application No. 62/745,121, filed on Oct. 12, 2018.

(51) Int. Cl.
| | |
|---|---|
| *G06F 3/04845* | (2022.01) |
| *G06F 3/0482* | (2013.01) |
| *G06T 11/40* | (2006.01) |
| *G06T 11/60* | (2006.01) |

(52) U.S. Cl.
CPC ........ *G06F 3/04845* (2013.01); *G06F 3/0482* (2013.01); *G06T 11/40* (2013.01); *G06T 11/60* (2013.01); *G06T 2210/56* (2013.01)

(58) Field of Classification Search
CPC .... G06F 3/04845; G06F 3/0482; G06T 11/40; G06T 11/60
See application file for complete search history.

(56) References Cited

U.S. PATENT DOCUMENTS

| | | | | |
|---|---|---|---|---|
| 7,385,612 | B1* | 6/2008 | Peterson | G06T 3/0093 345/581 |
| 2004/0257367 | A1* | 12/2004 | Smith | G06T 11/60 345/441 |
| 2005/0104894 | A1* | 5/2005 | Sanborn | G06T 11/203 345/592 |
| 2015/0207997 | A1* | 7/2015 | Muehrke | H04N 5/2228 348/333.01 |
| 2017/0295361 | A1* | 10/2017 | Dashwood | G06F 3/012 |

* cited by examiner

*Primary Examiner* — Matthew Ell
*Assistant Examiner* — David V Luu
(74) *Attorney, Agent, or Firm* — FIG. 1 Patents

(57) ABSTRACT

A unified digital image selection system is described for selection and editing of both vector and raster graphics together. In one example, a first user input is received that selects a region of a digital image. In response to the first user input, a vector selection representation is generated of at least a portion of a vector graphic included in the selected region. A raster selection representation is also generated of at least a portion of a raster graphic included in the selected region in response to the first user input. A second user input is also received specifying a digital image editing operation. In response to the second user input, both the vector selection representation and the raster selection representation using the digital editing operation. The digital image is then displayed as having the edited vector selection representation and the edited raster selection representation.

20 Claims, 16 Drawing Sheets

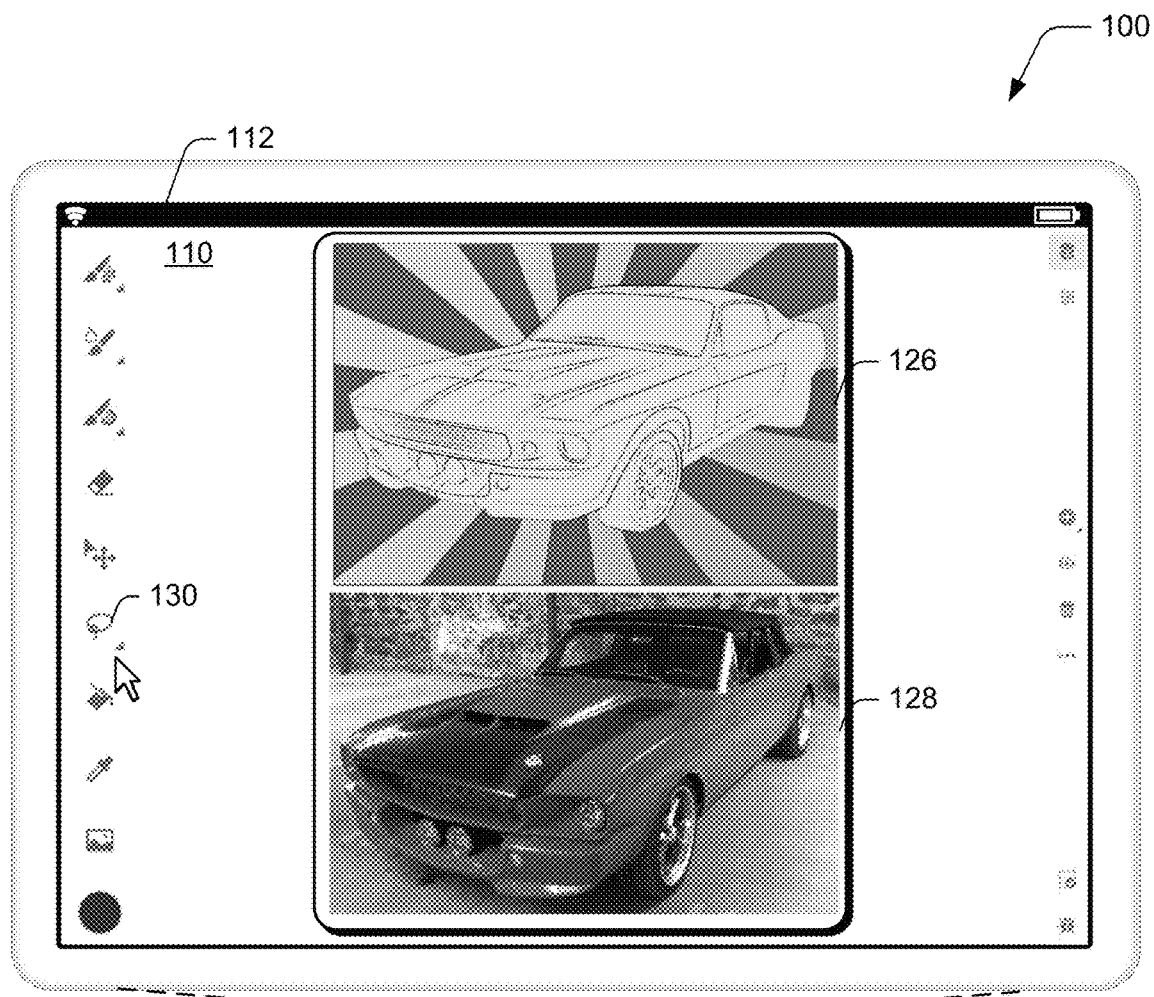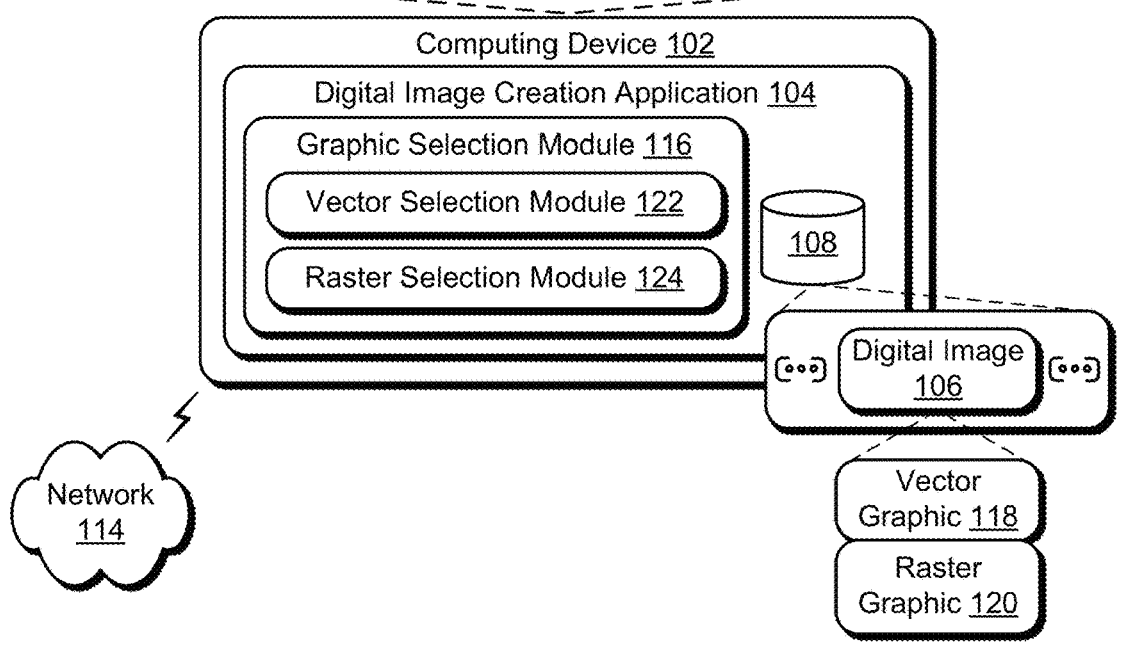
Fig. 1

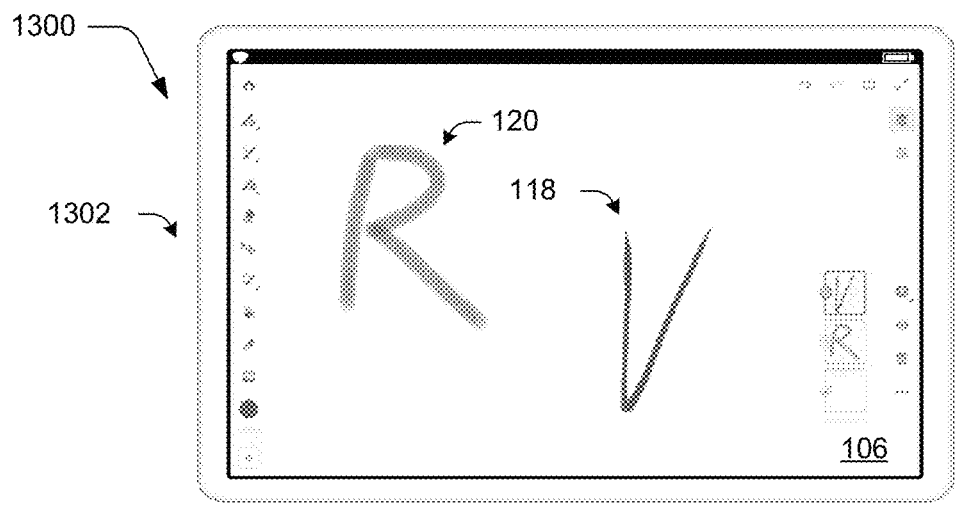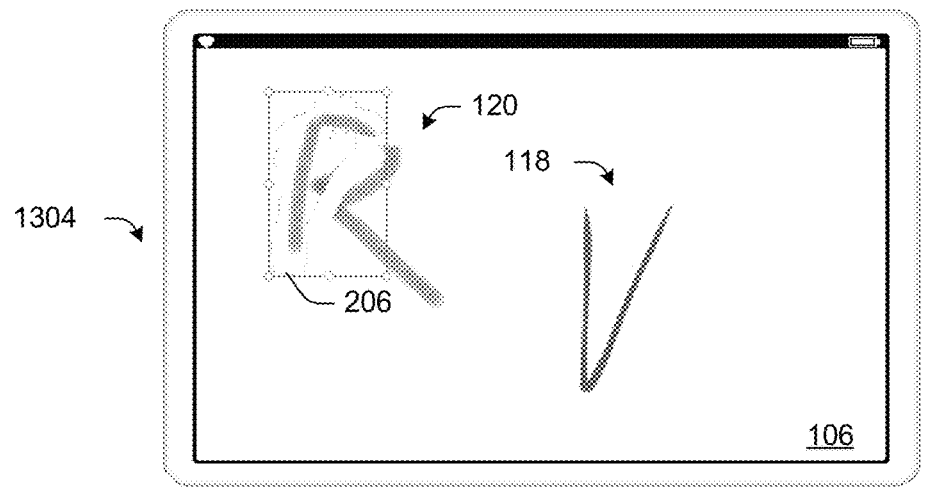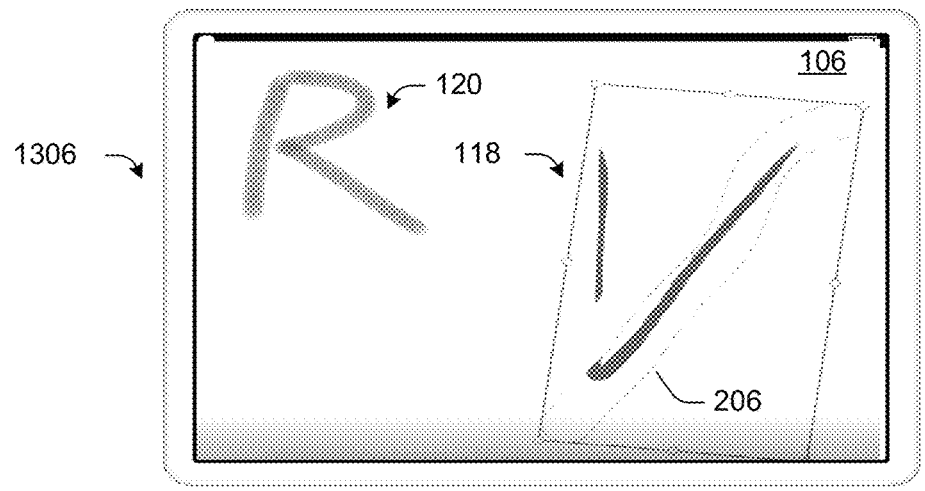
Fig. 13

UNIFIED DIGITAL CONTENT SELECTION SYSTEM FOR VECTOR AND RASTER GRAPHICS

RELATED APPLICATIONS

This Application claims priority under 35 U.S.C. § 119(e) to U.S. Provisional Patent Application No. 62/745,121, filed Oct. 12, 2018 and titled "Unified Digital Content Selection System for Vector and Raster Graphics," the entire disclosure of which is hereby incorporated by reference.

BACKGROUND

Digital image creation applications may be configured to generate a diverse range of graphic elements as part of creating a digital image, examples of which include vector graphics and raster graphics. Vector graphics, for instance, may be used to support shapes that, when rendered in a user interface, have smooth edges regardless of a level of zoom applied to the shape. To do so, the vector graphic is defined mathematically (e.g., using Bézier curves) and then drawn for a particular zoom level of a user interface. Raster graphics, on the other hand, are defined using a matrix that represents a generally rectangular grid of pixels, e.g., as a bitmap. Raster graphics are generally used for digital photos and to create visual effects such as mimicking a look of a pencil, brush stroke, sprayed paint, and so forth.

Conventional digital image creation applications, however, do not address vector and raster graphic editing functionality together. Rather, conventional digital image creation applications implement separate sets of tools to select and edit vector and raster graphics. For vector graphics, conventional applications rely on selection tools to select and modify the underlying mathematical structure of a vector graphic (e.g., to select and move a control point of a Bézier curve) and are not usable to select pixels, directly. For raster graphics, on the other hand, conventional applications employ selection tools to select the pixels, directly, but are not usable for vector graphics. As a result, conventional digital image creation applications require users to interact with and learn a multitude of separate tools, which is both user and computationally inefficient and leads to user frustration.

SUMMARY

A unified digital image selection system for selection and editing of both vector and raster graphics together is described that overcomes the limitations of conventional techniques that rely on separate tools and applications. In one example, a first user input is received that selects a region of a digital image. In response to the first user input, a vector selection representation is generated of at least a portion of a vector graphic included in the selected region. A raster selection representation is also generated of at least a portion of a raster graphic included in the selected region in response to the first user input.

A second user input is also received specifying a digital image editing operation. In response to the second user input, both the vector selection representation and the raster selection representation using the digital editing operation. The digital image is then displayed as having the edited vector selection representation and the edited raster selection representation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1 is an illustration of an environment in an example implementation that is operable to employ unified digital image selection and editing techniques for vector and raster graphics described herein.

FIG. 13 depicts an example implementation in which a selected region is used to transform raster and vector graphics.

DETAILED DESCRIPTION

Overview

Figure 2:
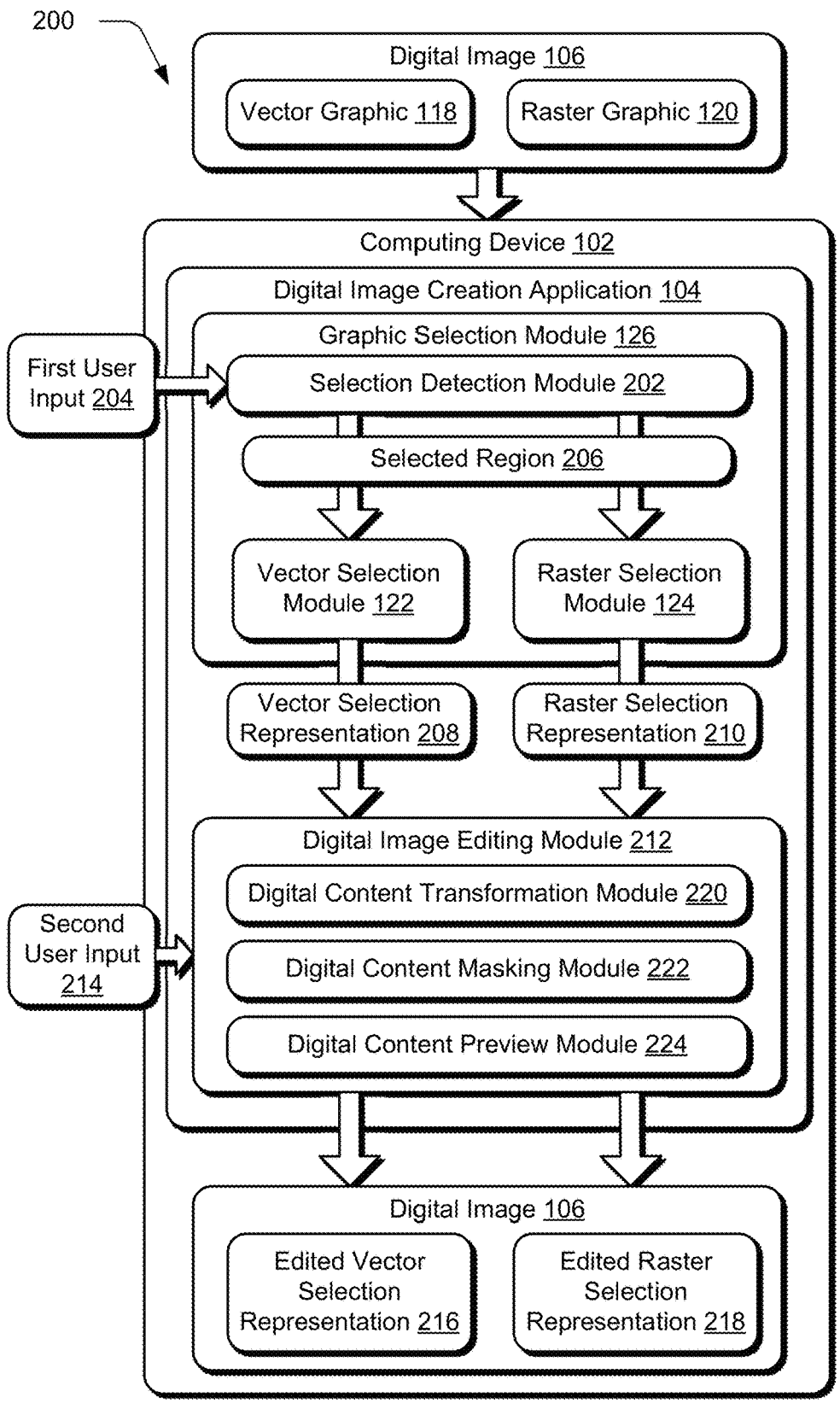
FIG. 2 depicts a system in an example implementation showing operation of a graphic selection module of FIG. 1 in greater detail.

Conventional digital image creation applications address vector graphics and raster graphics using separate functionality. Vector graphics are defined mathematically, e.g., using control points that are connected by curves, to form shapes, polygons, and so forth. Each of these control points are defined on an X/Y axis and are used to determine a direction of a path through the use of handles. The curve may also have defined properties, including stroke color, shape, curve, thickness, fill, and so forth. Bézier curves are an example of type of parametric curve that is used to define a vector graphic. Bézier curves, for instance, may be used to model smooth curves that can be scaled indefinitely. Curves may be joined together, which are referred to as paths. Vector graphics may be found in a variety of graphic file formats, examples of which include scalable vector graphics (SVG), encapsulated postscript (EPS), and portable document format (PDF).

A raster graphic, on the other hand, is implemented as a bitmap having a dot matrix data structure that represents a generally rectangular grid of pixels. A bitmap (i.e., a single-bit raster) corresponds bit-for-bit with a graphic displayed by a display device. A raster graphic is generally characterized by a width and height of the graphic in pixels and by a number of bits per pixel, or color depth, which determines the number of colors represented. Raster graphics may be found in a variety of graphic file formats, examples of which include joint photographic experts group (JPEG), portable network graphics (PNG), animated portable network graphics (APNG), graphics interchange format (GIF), moving picture experts group (MPEG) 4, and so forth.

Thus, as is readily apparent, an underlying structure of a vector graphic is quire different than an underlying structure of a raster graphic. Because of this, conventional digital image editing operations support different functionality to select and edit vector graphics as opposed to raster graphics. For vector graphics, for instance, conventional applications rely on path selection tools to select and modify the underlying mathematical structure of a vector graphic (e.g., to select and move a control point of a Bézier curve) and are not usable to select pixels, directly. For raster graphics, on the other hand, conventional applications employ direct selection tools to select the pixels, directly, but are not usable for vector graphics. As a result, conventional digital image creation applications require users to interact with and learn a multitude of separate tools, which is both user and computationally inefficient and leads to user frustration.

Accordingly, techniques and systems are described that support unified selection and editing of vector and raster graphics together by a digital image creation application. In one example, the digital image creation application receives a user selection of a representation of a graphic selection tool, e.g., a "lasso" to specify region within a specified border, a "magic-wand" to select adjacent colors within a threshold amount of a selected region, a bounding box, and so forth. Another user input is also received by the digital image creation application to select a region within a digital image as displayed in a user interface by a display device, e.g., less than an entirety of the digital image.

In response to the selection of the region, the digital image creation application generates a vector selection representation and a separate raster selection representation. A vector selection module, for instance, may be employed by the digital image creation system to generate and store (e.g., in a computer-readable storage medium) a vector selection representation of a portion of any vector graphic that is included within the selected region. The vector graphic representation, for instance, may be formed to include control points and curves of vector graphics that are included within the selected region, along with defined properties of the curve such as stroke color, shape, curve, thickness, fill, and so forth.

A raster selection module is also employed to generate a raster selection representation that includes pixels of a raster graphic that is included in the selected region. The raster selection module, for instance, may generate a gray-scale raster mask in which white pixels indicate pixels that are to be included in their entirety as part of the selected region from the digital image, black pixels indicate pixels that are not to be included in the selected region, and gray pixels indicating respective amounts of pixels (i.e., pixel color) that is to be included in the selected region to support a blend area.

In this way, the digital image creation module maintains separate representations of graphics included in the selected region in response to a single user input and through use of a single selection tool, which may then be edited using digital editing operations. The digital image creation module, for instance, may support movement or deletion of both the vector and raster selection representations within the digital image, together using a single operation. In another instance, the digital image creation module also supports masking operations, in which, the selected region is used to contain an effect of digital image operations within the region, e.g., to draw vector and raster graphics.

In a further instance, the digital image creation module also supports transformations to the vector and raster selection representations, e.g., to change color, size, rotation, and so forth. A user input, for instance, may be received to increase a scale of the selected region. In response, the digital image creation application scales a portion of a vector graphic within the selected region using the underlying mathematical representation. The digital image creation application also up-samples the portion of the raster graphic included in the raster selection representation. In this way, the digital image creation application may synchronize digital editing operations to both representations as desired through use of a unified input structure that maintains the underlying functionality of the vector and raster graphics, which is not possible in conventional techniques.

In an implementation, the digital image creation application supports a raster-based preview of the vector graphic to support real time performance before committing to the vector representation. An input, for instance, may be received to draw a vector graphic, which is initially displayed as a raster graphic until completion of the stroke, which is then converted to control points of a vector graphic. This supports real time output of the graphic and increases computational efficiency, especially when combined with multiple curves and paths as part of union or subtraction operations. Further discussion of these and other examples is included in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 16.

The computing device 102 is illustrated as including a digital image creation application 104. The digital image creation application 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the digital image creation application 104 may also be implemented as whole or part via functionality available via the network 114, such as part of a web service or "in the cloud."

An example of functionality incorporated by the digital image creation application 104 to process the image 106 is illustrated as a graphic selection module 116. The graphic selection module 116 supports unified digital image selection and editing of vector graphics 118 and raster graphics 120 included within a digital image 106 through use of respective vector and raster selection modules 122, 124.

Vector graphics 118 are defined mathematically using two-dimensional points, (e.g., control points) that are connected by curves, to form shapes, polygons, and so forth. Each of these control points are defined on an X/Y axis and are used to determine a direction of a path through the use of handles. The curve may also have defined properties, including stroke color, shape, curve, thickness, fill, and so forth. An example vector graphic 126 is illustrated as displayed in the user interface 110 by the display device 112.

A raster graphic 120, on the other hand, is implemented as a bitmap having a dot matrix data structure that represents a generally rectangular grid of pixels. Raster graphics are typically used to capture photographs by digital cameras, an example raster graphic 128 is illustrated as displayed in the user interface 110 by the display device 112. A raster graphic 120 is generally characterized by a width and height of the graphic in pixels and by a number of bits per pixel, or color depth, which determines the number of colors represented.

Due to the differences between vector and raster graphics 118, 120, conventional digital image creation applications that support both vector and raster graphic editing do not support both types of graphics equally and do not support a single selection model. Rather, conventional applications force users to use separate selection and drawing tools to edit vector and raster graphics. In one conventional example in which the application is pixel based (e.g., for editing digital photographs), the selection tools select pixels on raster layers, with path selection tools used to select control points of Bézier curves for vector graphics. In this conventional example, raster selection cannot be used on vector graphics and the operations available to edit raster selections are different than the operations available to edit vector selections. In another conventional example, the application leverages vector graphics to produce illustrations such as logos, clip art, and so forth. In this conventional example, the application does not support pixel level selection and editing commands and thus forces users to switch to a different application to do so. Thus, conventional digital image creation applications are disjointed and inefficient, both computationally with respect to use of multiple applications and tools as well as user inefficient by requiring users to learn and implement these separate tools, which may be frustrating.

Accordingly, in the techniques described herein the graphic selection module 116 supports a unified digital image selection system that supports selection and editing of vector and raster graphics 118, 120 together. A user input, for instance, may be received by the graphic selection module 116 that selects a representation of a graphic selection tool 130, e.g., a "lasso" in the illustrated example. Another user input is then received to select a region within the digital image, which causes the vector and raster selection modules 122, 124 to generate separate representations that are maintained in memory of the computing device 102. The selected region may be visualized in a number of ways, including "marching ants" (e.g., a moving dashed border), a colored overlay, an "onion skin," and so forth.

The representation of the vector graphic 118 maintains the underlying mathematical structure and thus has infinite resolution, whereas the representation of the raster graphic includes pixels from the selected region and thus has the same resolution as the underlying graphics. Digital editing operations implemented through use of tools or commands to edit the selected region are applied by the graphic selection module 116 to both representations in parallel, and thus the edits are synchronized for both types of graphics. The selected region may also act as a mask to support drawing within the region, with the raster graphics masked using a blending mode and vector graphics masked using a planar map. The graphic selection module 116 may also support functionality to convert vector graphics 118 to raster graphics 120 via rasterization or convert raster graphics 120 to vector graphics 118 via curve fitting. Further discussion of these and other examples is included in the following section.

In general, functionality, features, and concepts described in relation to the examples above and below may be employed in the context of the example procedures described below. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Unified Selection and Editing of Vector and Raster Graphics

Figure 3:
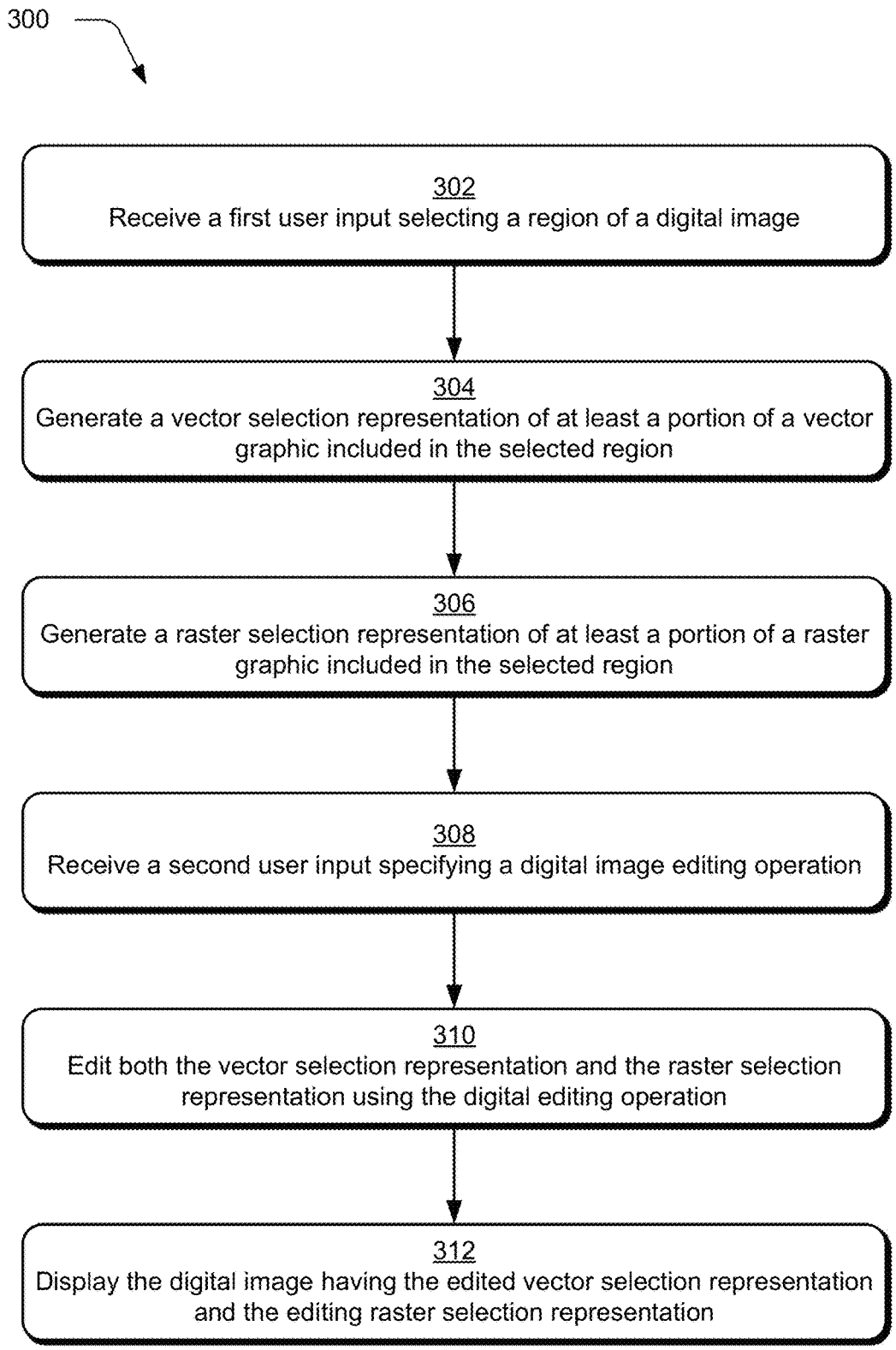
FIG. 3 is a flow diagram depicting a procedure in an example implementation in which a single user input selecting a region of a digital image is used as a basis for selecting and editing vector and raster graphics included in the selected region.
Figure 4:
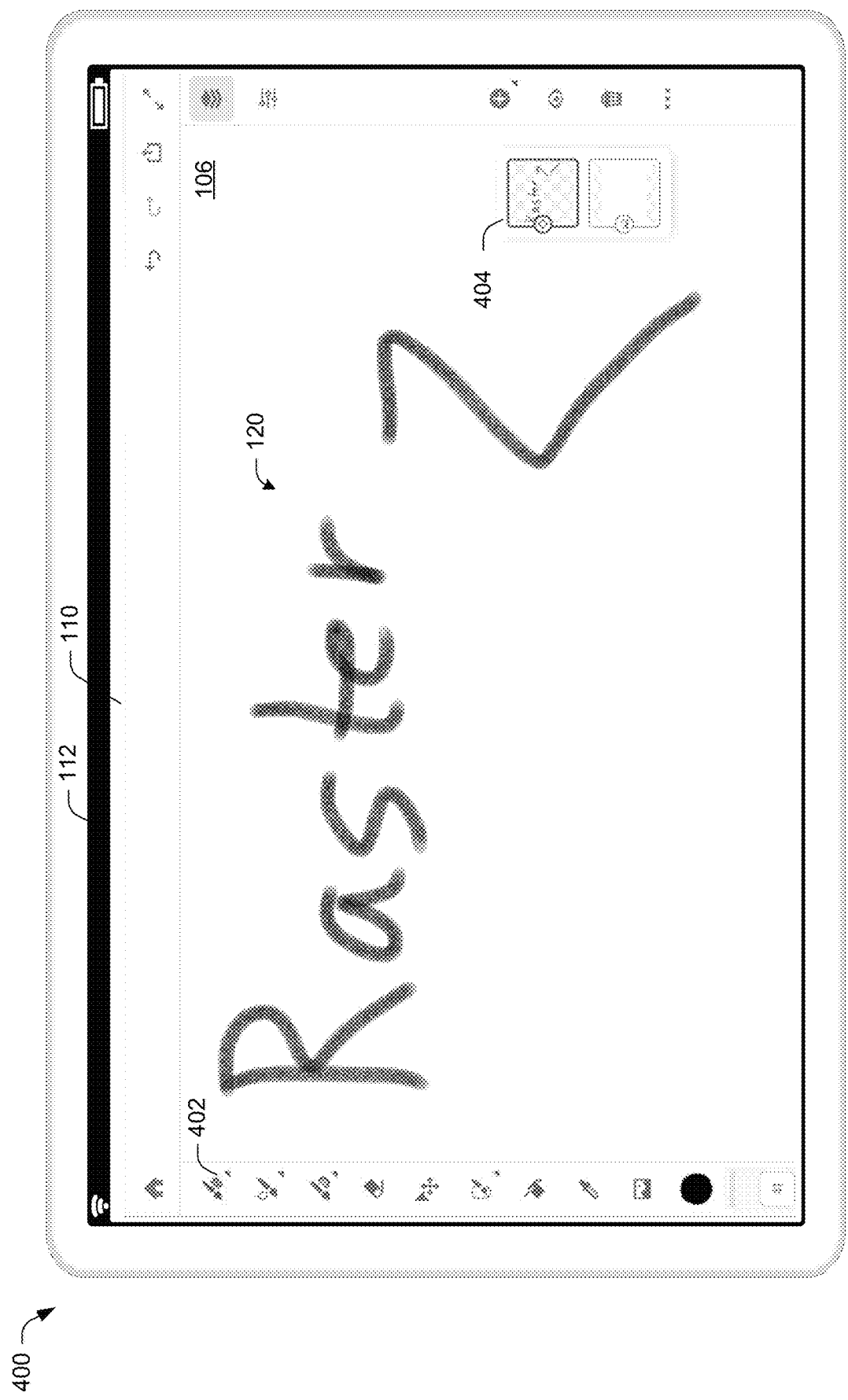
FIG. 4 depicts an example implementation of generation of a raster graphic as part of a digital image using a digital image creation application of FIG. 1.

FIG. 2 depicts a system in an example implementation showing operation of a graphic selection module of FIG. 1 in greater detail. FIG. 3 depicts a procedure 300 in an example implementation in which a single user input selecting a region of a digital image is used as a basis for selecting and editing vector and/or raster graphics included in the selected region.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-15.

This example begins by creating a digital image 106 by a digital image creation application 104 that includes a vector graphic 118 and a raster graphic 120. As shown in an example implementation 400 of FIG. 4, a user input is received by the digital image creation application 104 that selects a representation of a raster drawing tool 402 to then draw the raster graphic 120 (e.g., as a gesture or via a cursor control device), which is maintained in a dedicated raster layer 404 in the digital image 106.

Figure 5:
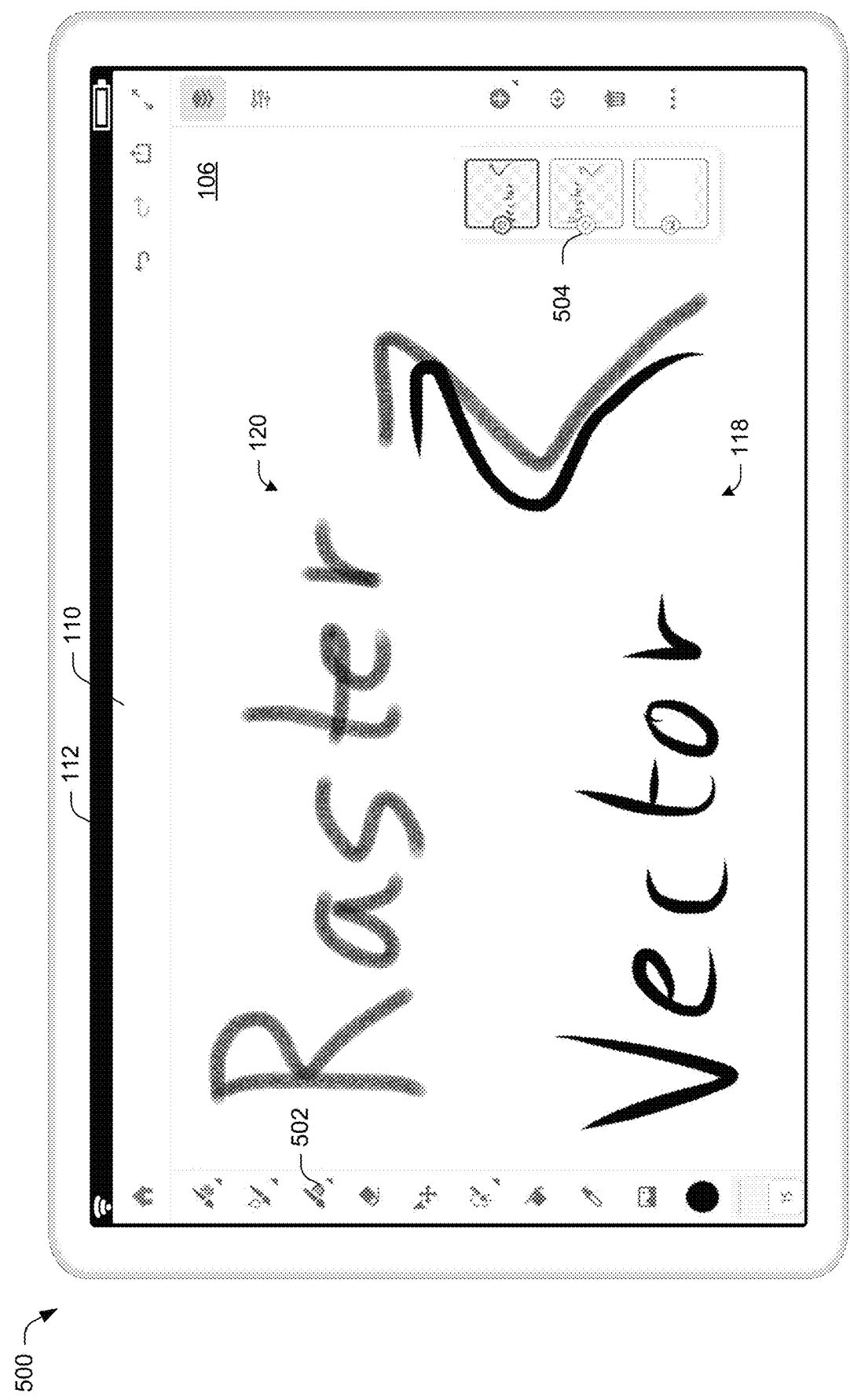
FIG. 5 depicts an example implementation of generation of a vector graphic as part of a digital image using a digital image creation application of FIG. 1.

As shown in an example implementation 500 of FIG. 5, a user input is also received by the digital image creation application 104 that selects a representation of a vector drawing tool 502 to then draw the vector graphic 118 (e.g., as a gesture or via a cursor control device), which is maintained in a dedicated vector layer 504 in the digital image 106. Thus, at this point the digital image 106 includes both vector and raster graphics 118, 120 within a single digital image 106.

Figure 6:
FIG. 6 depicts an example implementation of a selected region that includes a portion of the raster graphic of FIG. 4.
Figure 7:
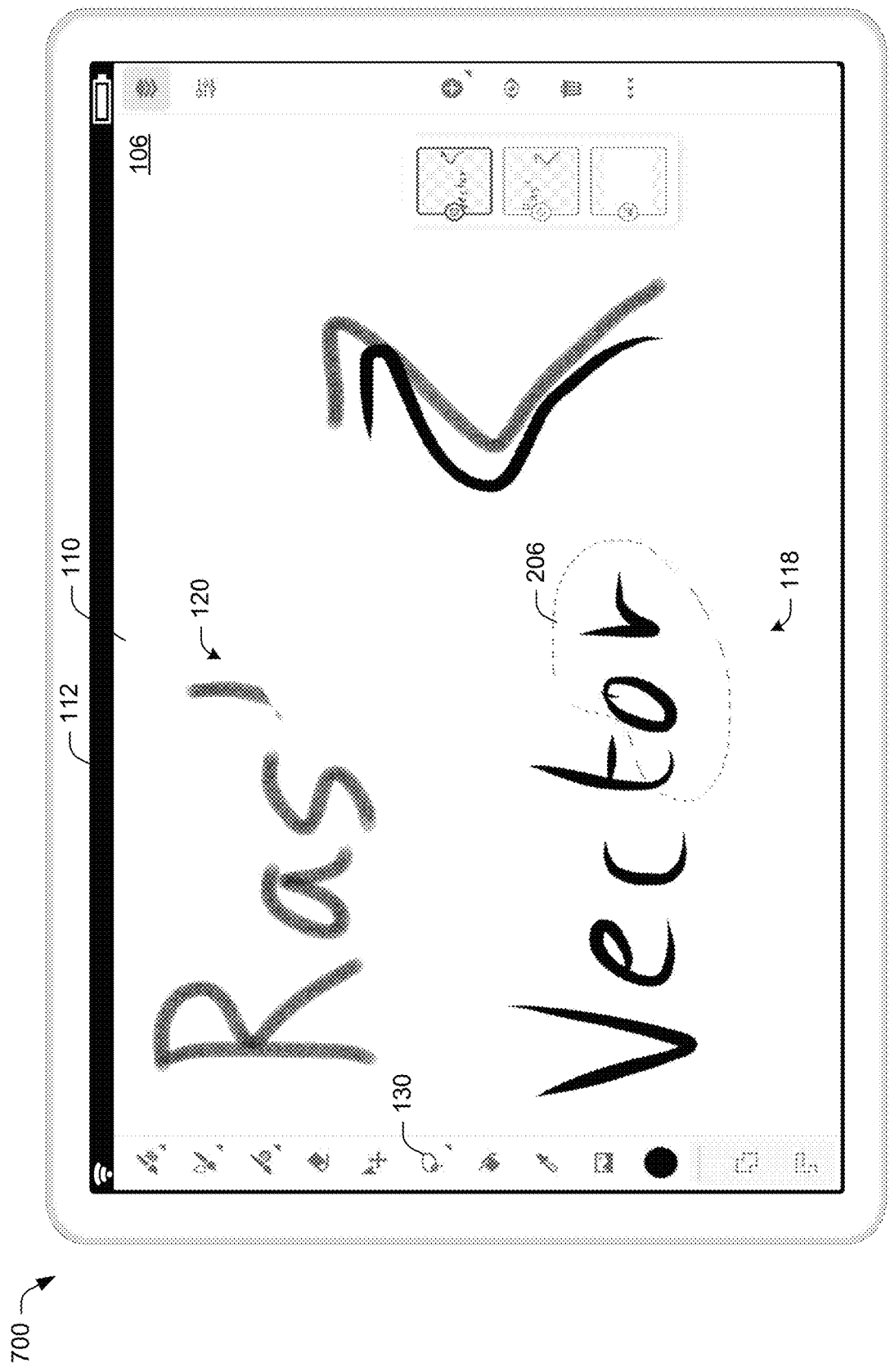
FIG. 7 depicts an example implementation in which the selected region of the portion of the raster graphic of FIG. 6 is deleted and another selection region includes a portion of a vector graphic.
Figure 8:
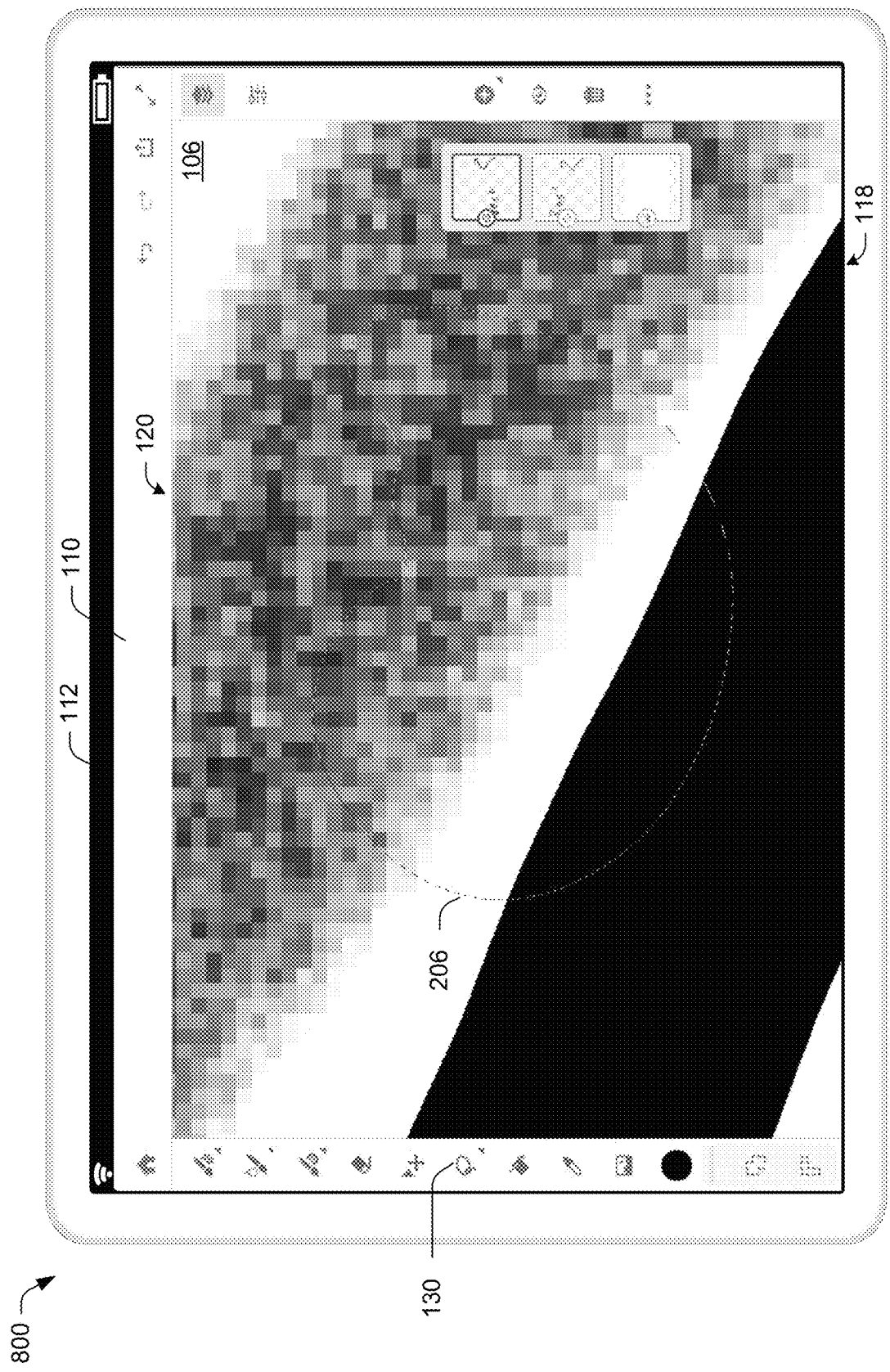
FIG. 8 depicts an example implementation in which a selected region includes both a portion of a raster graphic and a portion of a vector graphic, and in which a visualization of the selected region corresponds to the vector graphic.
Figure 9:
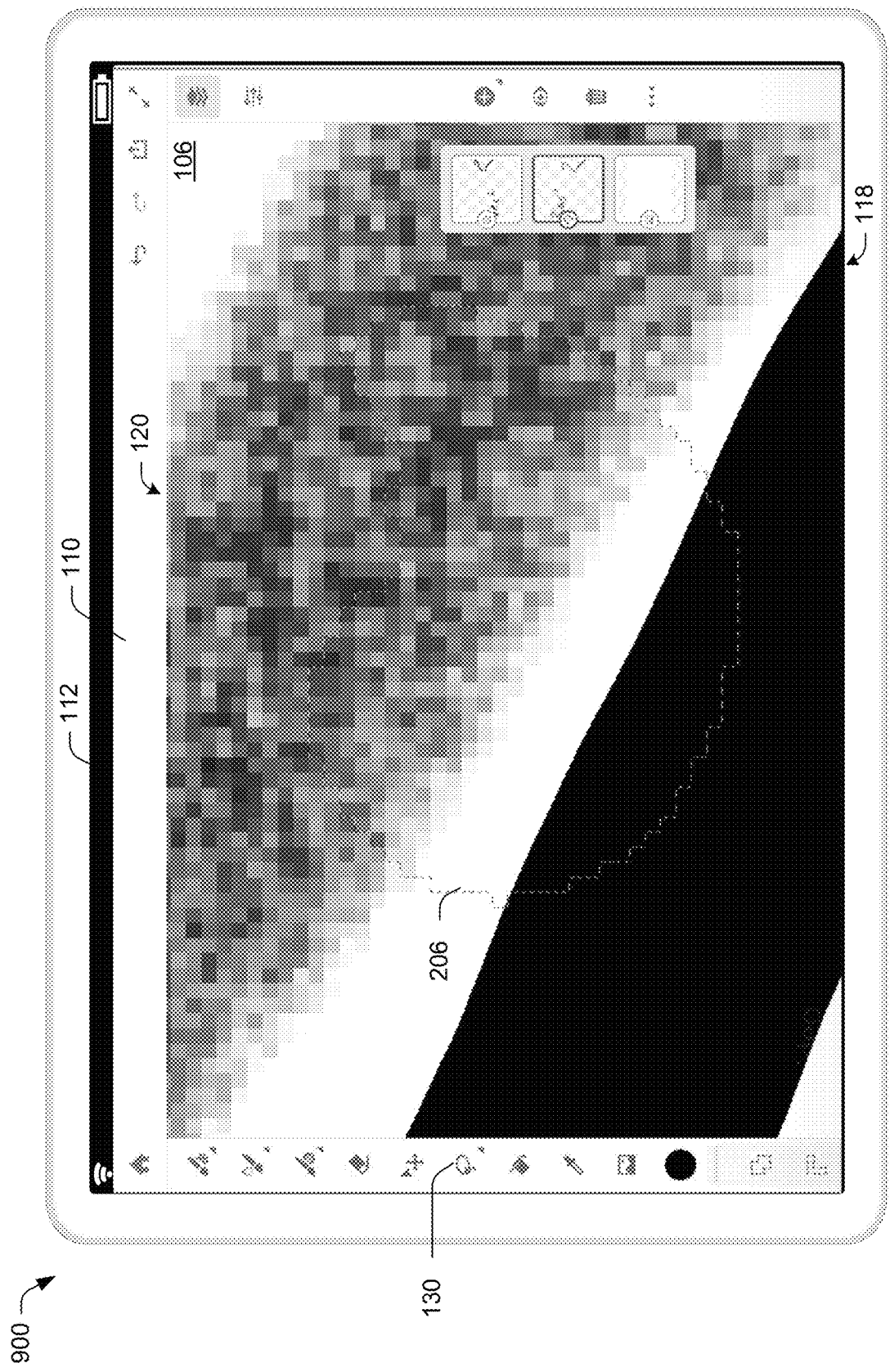
FIG. 9 depicts an example implementation in which a selected region includes both a portion of a raster graphic and a portion of a vector graphic, and in which a visualization of the selected region corresponds to the raster graphic.
Figure 10:
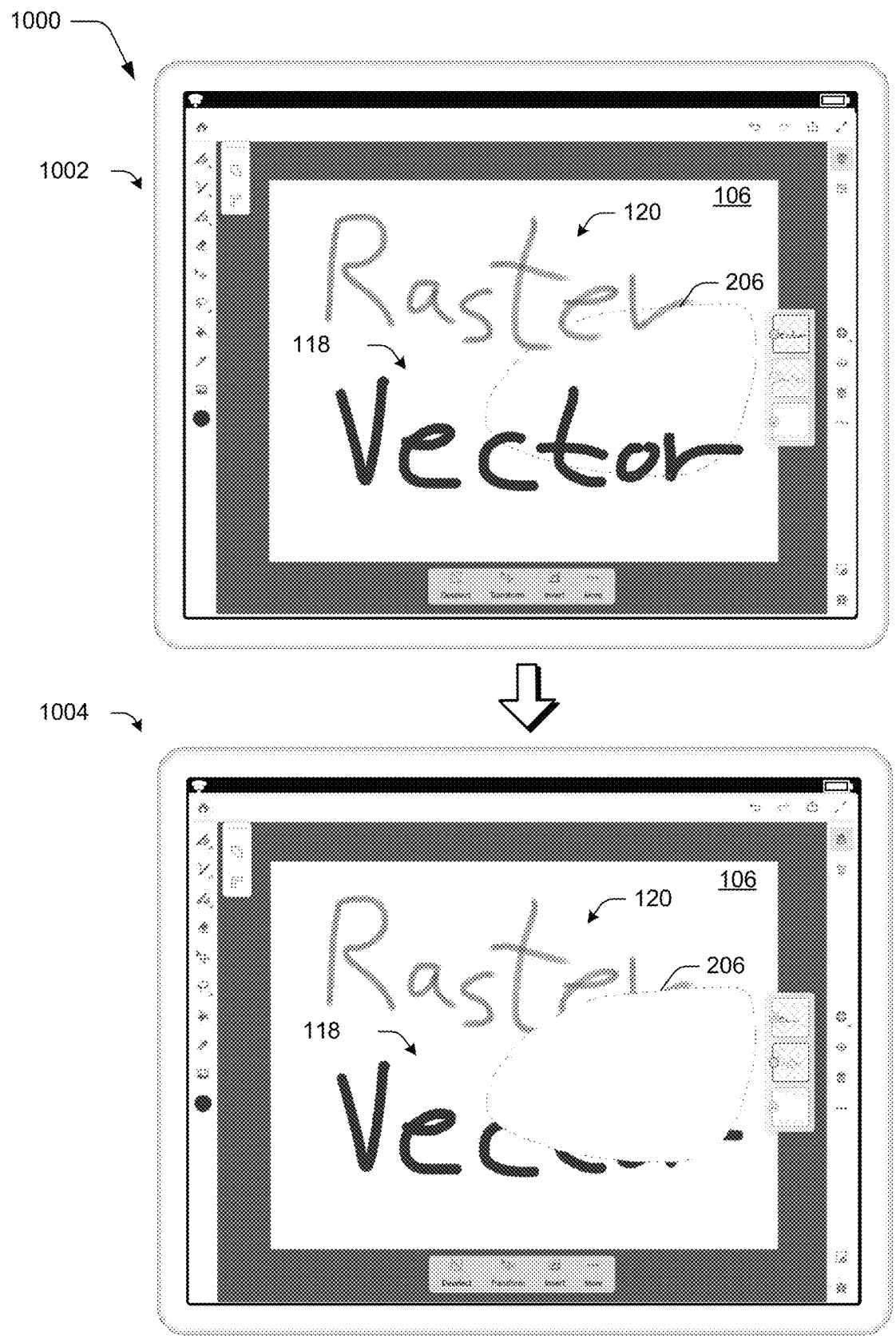
FIG. 10 depicts an example implementation in which a selected region includes both a portion of a raster graphic and a portion of a vector graphic, which is deleted together using a digital editing operation.

To initiate selection, a user input is received that selects a representation of a graphic selection tool 130, e.g., a "lasso" in the illustrated example 600 of FIG. 6. A selection detection module 202 then receives a first user input 204 that selects a region 206 of the digital image 106 (block 302). In the illustrated lasso example, for instance, a freeform line is used to define an outer border of the selected region 206. Once completed, the selection detection module 202 is configured to indicate the selected region, including "marching ants" (e.g., a moving dashed border) as illustrated, a colored overlay, an "onion skin," and so forth. Similar functionality may also be used to define a bounding box, e.g., through use of a click-and-drag operation using a cursor control device or gesture. Other examples are also contemplated, including use of a "magic wand" as further described below in relation to FIG. 15 as well as intelligent selection of objects using machine learning to detect subjects or edges of objects. In this way, the selected region 206 may include a portion of the digital image 106, to which, a digital editing operation is to be applied.

As previously described, unified selection of vector and raster graphics 118, 120 is supported by the graphic selection module 126 such that a single tool may be used for selection and editing of vector graphics 118, raster graphics 120, or both. Thus, in FIG. 6 the selected region 206 includes a portion of the raster graphic 120, which is then deleted in a digital editing operation as shown in an example 700 of FIG. 7. As also shown in the example 700 of FIG. 7, another selected region 206 includes a portion of the vector graphic 118. Thus, the graphic selection tool 130 may be used for either the vector or raster graphics 118, 120.

The graphic selection tool 130 may also be used for simultaneous selection of both vector and raster graphics within the selected region 206. As shown in an example 800 of FIG. 8, for instance, the first user input 204 defines a selected region 206 that includes at least a portion of the vector graphic 118 and at least a portion of the raster graphic 120. The user interface 110 depicts the visualization of the selected region 206 as smooth in accordance with vector graphics in FIG. 8 whereas in an example 900 of FIG. 9 the visualization of the selected region 206 follows a pixel grid.

Returning again to FIG. 2, in response to the first user input 204, a vector selection representation 208 is generated by the vector selection module 122 of at least a portion of a vector graphic 118 included in the selected region 206 (block 304). The vector selection module 122, for instance, may identify control points and curves of the vector graphic 118 that are included within the selected region 206. Portions of the curve that are "cut off" at the edge of the selected region 206 may be recreated using curve fitting.

The vector selection representation 208 also includes defined properties of the vector graphic 118 that are within the selected region 206, including stroke color, shape, curve, thickness, fill, and so forth. In this way, the vector selection representation 208 maintains the underlying mathematical structure and thus is infinitely scalable and retains functionality of the vector graphic 118, e.g., to change control points, curves, defined properties, and so forth.

A raster selection representation 210 is also generated by the raster selection module 124 of at least a portion of a raster graphic 120 included in the selected region in response to the first user input (block 306). The raster selection representation 210, for instance, may include pixels from the bitmap that lie within a border of the selected region 206. In one example, the raster selection representation 210 is generated as a gray-scale raster mask, in which, white pixels indicate pixels that are to be included in their entirety as part of the selected region from the digital image, black pixels indicate pixels that are not to be included in the selected region, and gray pixels indicating respective amounts of pixels (i.e., pixel color) that is to be included in the selected region 206 to support a blend area.

The vector selection representation 208 and the raster selection representation 210 are stored to a computer-readable storage medium (e.g., memory) of the computing device 102 as a basis to perform a digital editing operation. A digital image editing module 212, for instance, may receive a second user input 214 specifying a digital image editing operation (block 308). In response to the second user input 214, both the vector selection representation 208 and the raster selection representation 210 are edited, together, using the digital editing operation (block 310), thereby generating an edited vector selection representation 216 and an edited raster selection representation 218. The digital image 106 is then displayed as having the edited vector selection representation 216 and the edited raster selection representation 218 (block 312).

A variety of different types of digital editing operations may be performed that leverage the selected region, examples of which are represented by a digital content transformation module 220, a digital content masking module 222, and a digital content preview module 224. A variety of transformations may be supported by the digital content transformation module 220. As shown in an example implementation 1000 of FIG. 10, for instance, at a first stage 1002 a selected region 206 includes portions of vector and raster graphics 118, 120, which is deleted together in a single operation as shown at the second stage 1004.

Figure 11:
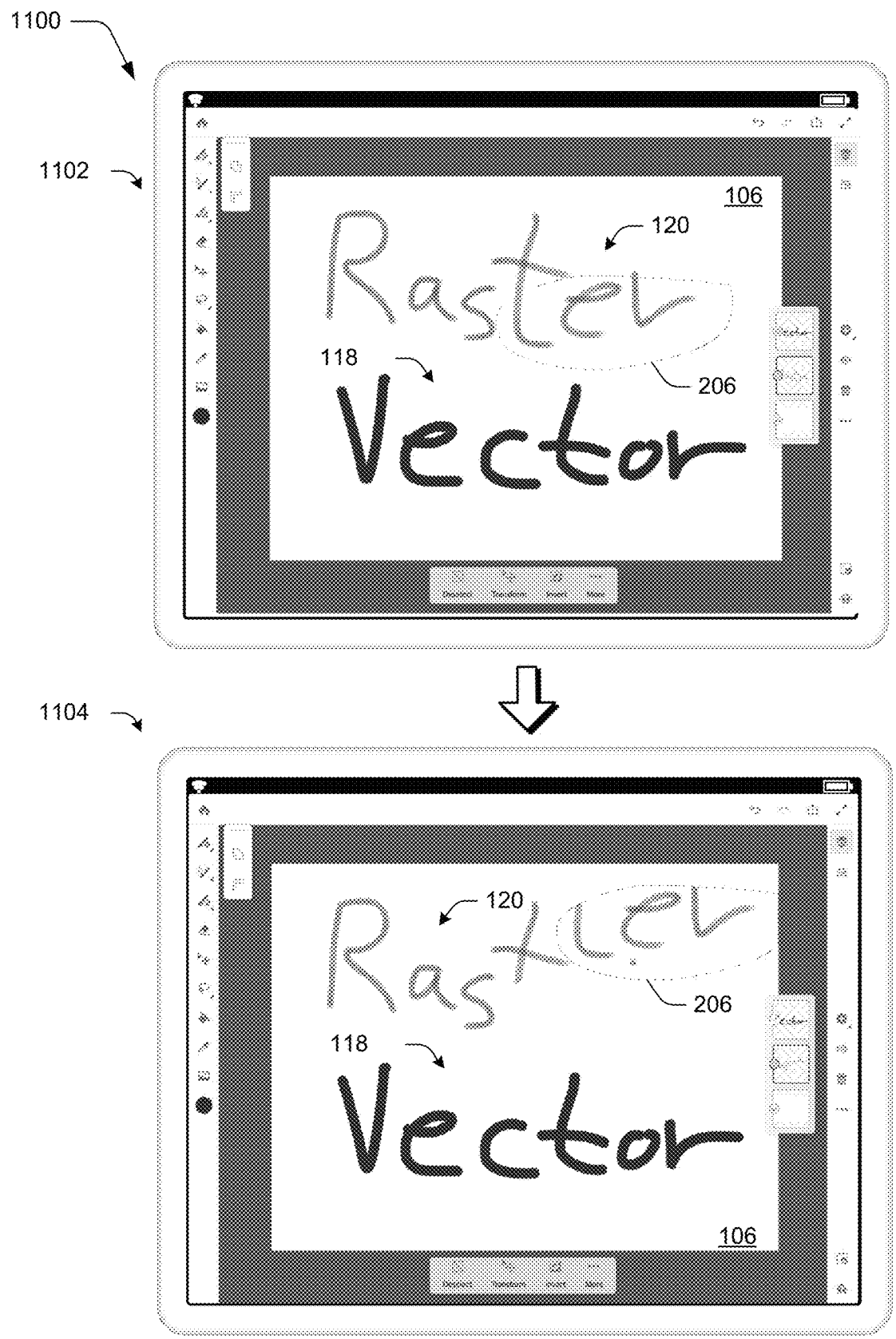
FIG. 11 depicts an example implementation in which a selected region includes a portion of a raster graphic that is moved using a digital editing operation.
Figure 12:
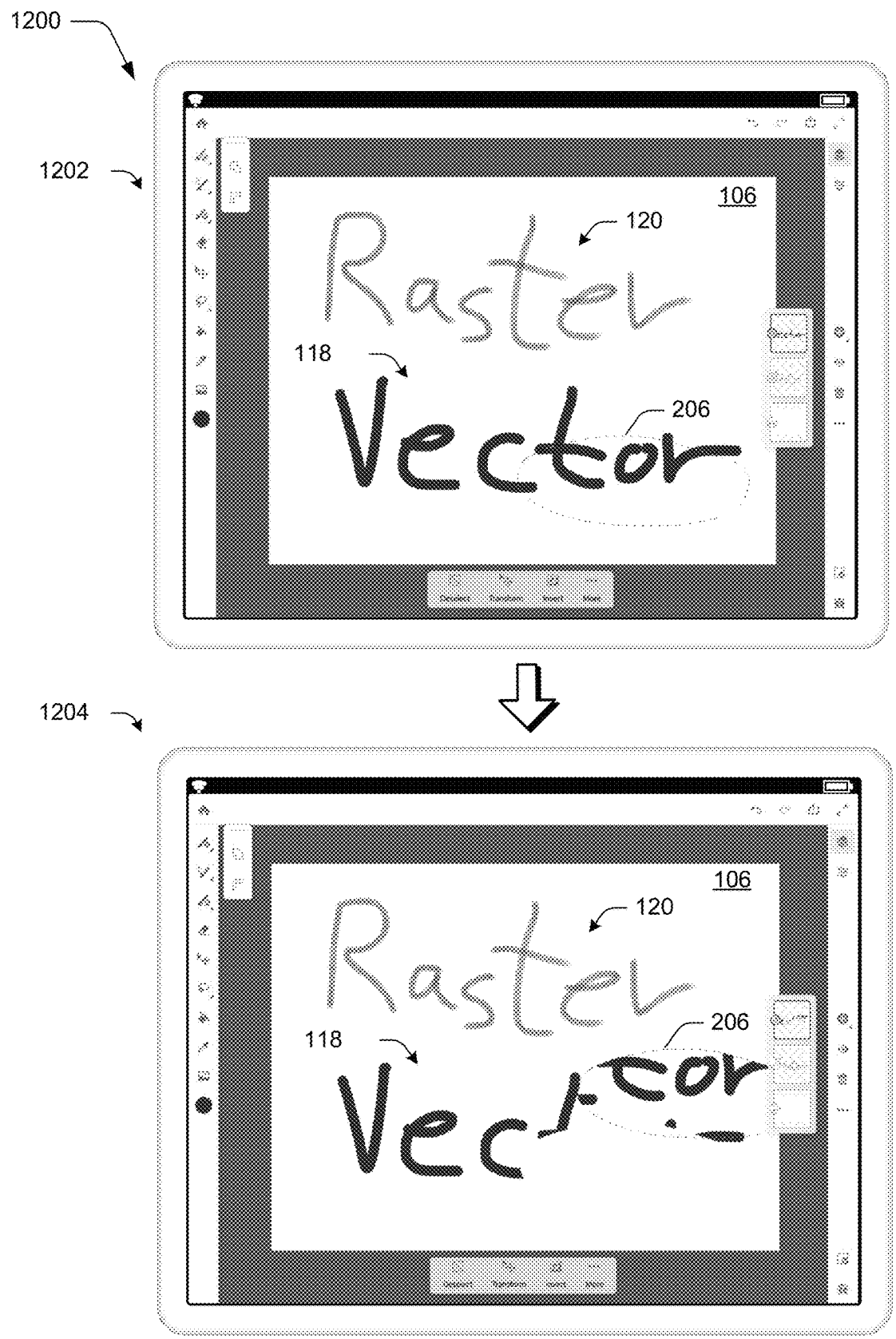
FIG. 12 depicts an example implementation in which a selected region includes a portion of a vector graphic that is moved using a digital editing operation.

In an example implementation 1100 of FIG. 11, the selected region 206 includes a portion of the raster graphic 120 at the first stage 1102. At the second stage 1104, the selected region 206 is moved within the digital image, e.g., via a gesture, a click-and-drag operation, and so forth. In an example implementation 1200 of FIG. 12, the selected region 206 includes a portion of the vector graphic 118 at the first stage 1202. At the second stage 1204, the selected region 206 is moved within the digital image.

In the example implementation 1300 of FIG. 13, resizing and rotation transformations are shown as applied to the selected region 206. At a first stage 1302, the digital image includes a vector graphic 118 and a raster graphic 120. At the second stage 1304, the selected region 206 includes a portion of the raster graphic 120, which is resized in the illustrated example by upsampling pixels included in the raster selection representation 210 that corresponds to the selected region. At the third stage 1306, the selected region 206 includes a portion of the vector graphic 118. The portion of the vector graphic 118 is resized based on the mathematical structure (e.g., proportional upward adjustment of spacing of control points and curves) included in the vector selection representation 208 that corresponds to the selected region 206. In this example, the vector selection representation 208 is also rotated with respect to the digital image 106. Scaling of the selected region 208 may be performed in a similar manner by downsampling and proportional downward adjustment of the selected region 206. Other transformations are also contemplated that may be implemented by the digital content transformation module 220, such as recoloring.

Figure 14:
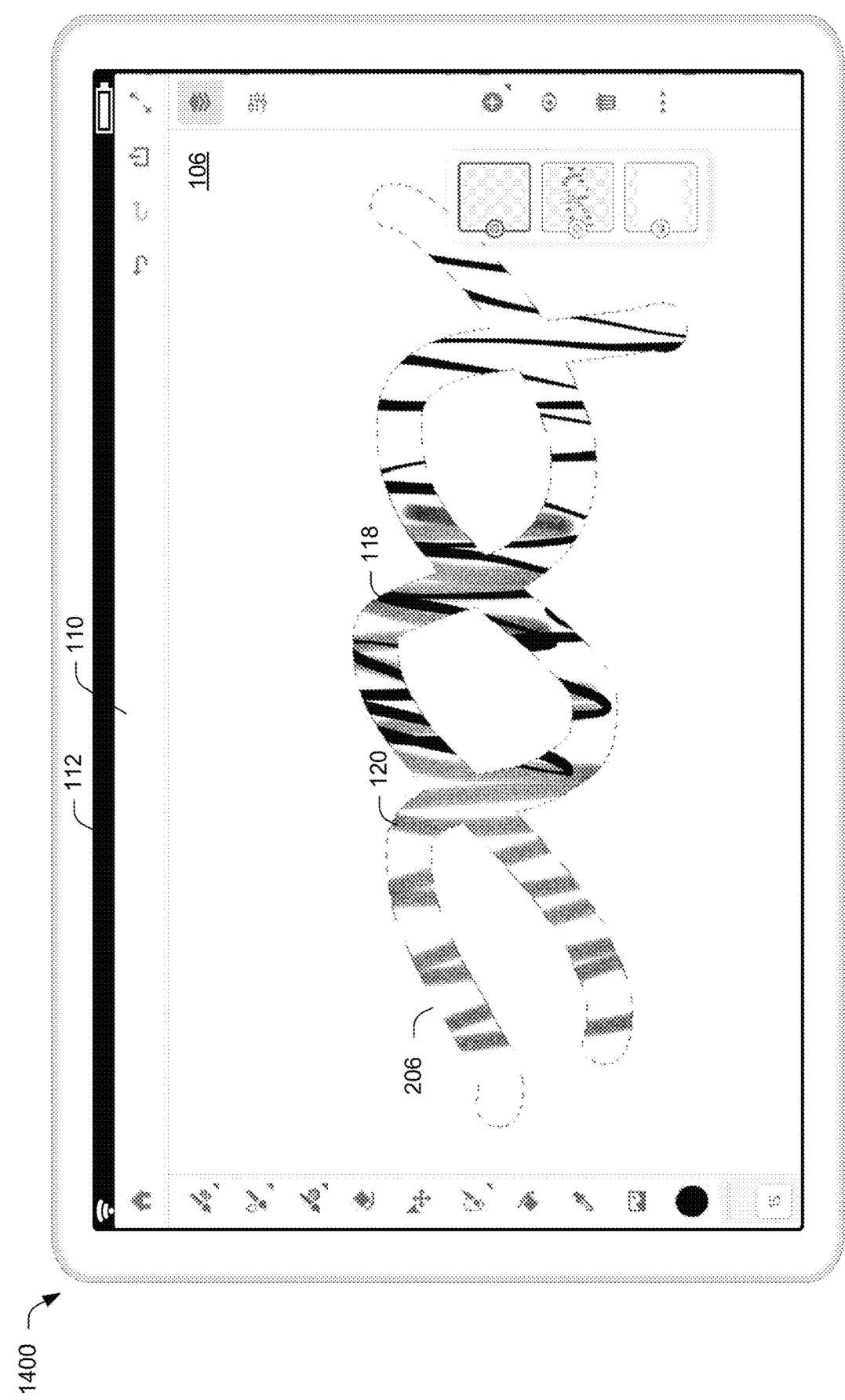
FIG. 14 depicts an example implementation in which a selected region is used to constrain a location, at which, digital editing operations are to be performed to add vector and/or raster graphics to a digital image.

FIG. 14 depicts an example implementation 1400 in which the selected region 206 is used to constrain a location, at which, digital editing operations are to be performed to add vector and/or raster graphics to the digital image 106. In this example, the digital content masking module 222 receives the first user input 204 as defining a selected region 206 as previously described, which may be performed using one or more strokes to form a union, intersection, and so forth of the selected region 206.

The second user input 214 is then used to define vector or raster graphics 118, 120 for inclusion within the selected region 206, which are "masked out" outside of this region within the digital image 106. In this way, a user may draw freely within the user interface 110 over the digital image 106, with inputs occurring within the selected region 206 being added to the digital image 106 and in which inputs occurring outside the selected region 206 are not added.

Figure 15:
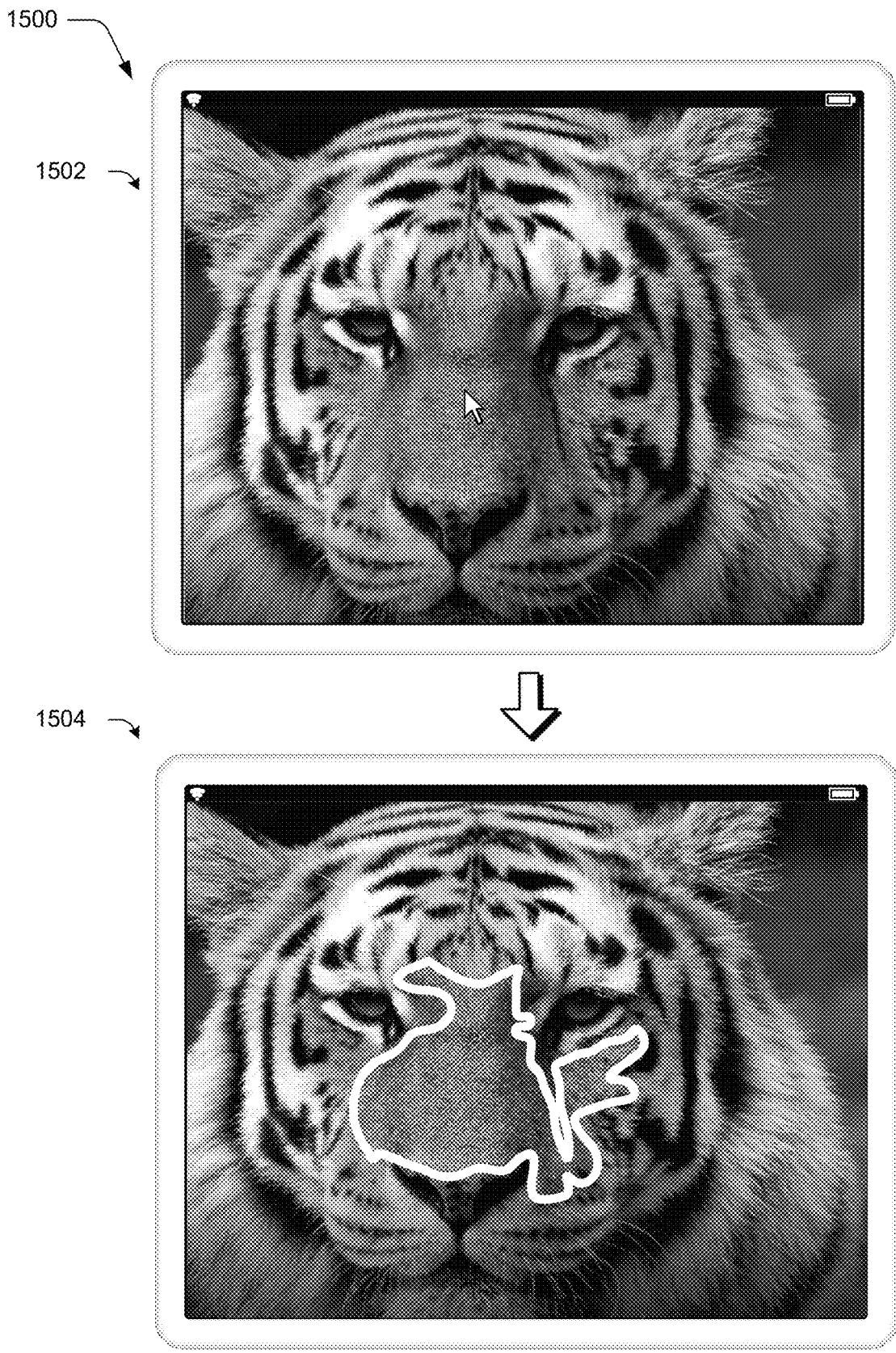
FIG. 15 depicts an example implementation in which a selected region is specified based on color values of pixels.

FIG. 15 depicts an example implementation 1500 in which a selected region 206 is specified based on color values of pixels. In the previous example, the select region 206 is formed by drawing a border, e.g., as a freeform line, bounding box, and so forth. In some instances, however, it may be difficult to use these tools to manually select a complex geometric shape. In a first stage 1502 of FIG. 15, for instance, a designer may wish to select a nose of the tiger. Manually drawing a border, however, may be difficult to perform accurately. Accordingly, the selection too may be configured as a "magic wand" in which the first user input 204 selects a pixel in the digital image 106. Pixels having color values within a threshold amount, which may be user selectable, are included in the selected region 206 by the selection detection module 202. The selected region 206 based on the pixels (e.g., bitmap) may also be used to select portions of vector graphics 118. This may be performed based on color, by curve fitting based on a border of the selected region 206, and so forth. For example, a "smart select" tool may be used that detects edges to make it easier for a user to loosely draw over an image and select along the edits. In addition machine learning based selection may be used to select the subject of an image Similar to magic wand examples above, the pixel based selection that comes from the smart select tool or subject selection tool is transformed into an equivalent vector representation. In this way, the graphic selection module 126 may support a variety of techniques to specify the selected region 206.

Example System and Device

Figure 16:
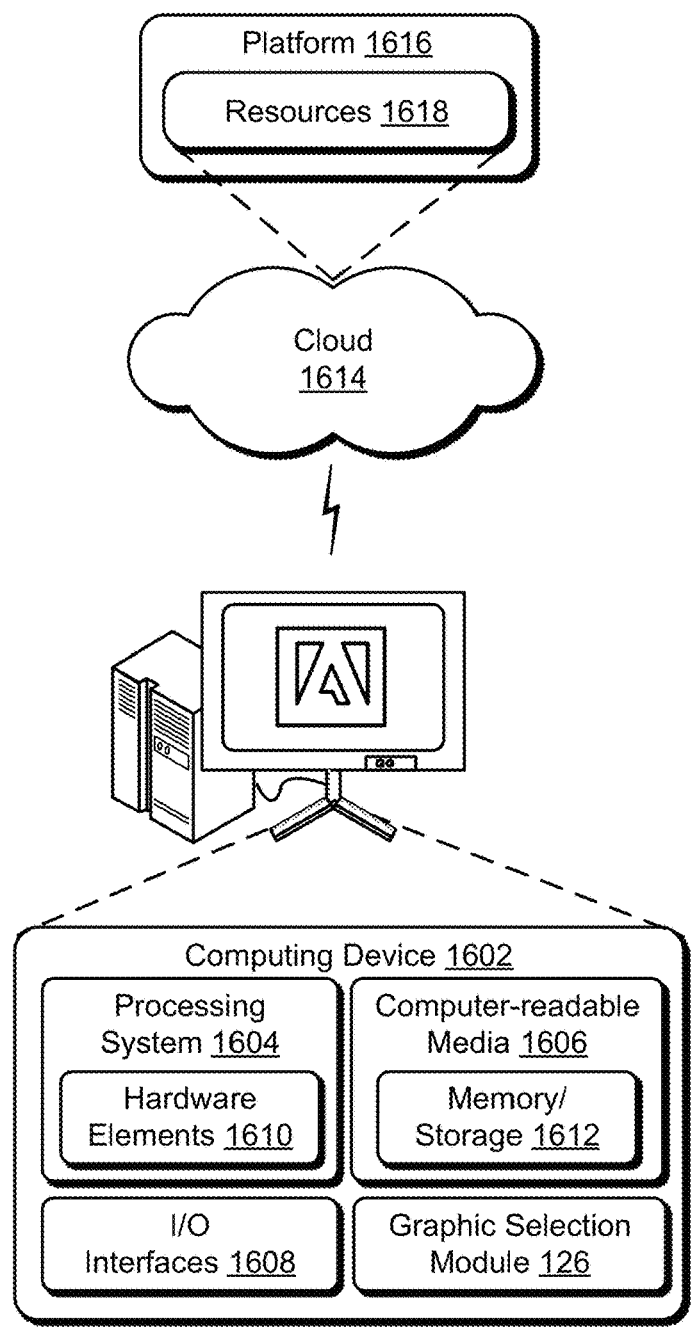
FIG. 16 illustrates an example system including various components of an example device that can be implemented as any type of computing device as described and/or utilize with reference to FIGS. 1-15 to implement embodiments of the techniques described herein.

FIG. 16 illustrates an example system generally at 1600 that includes an example computing device 1602 that is representative of one or more computing systems and/or devices that may implement the various techniques described herein. This is illustrated through inclusion of the graphic selection module 126. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O interface 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware element 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources 1618 may include applications and/or data that can be utilized while computer processing is executed on servers that are remote from the computing device 1602. Resources 1618 can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources 1618 that are implemented via the platform 1616. Accordingly, in an interconnected device embodiment, implementation of functionality described herein may be distributed throughout the system 1600. For example, the functionality may be implemented in part on the computing device 1602 as well as via the platform 1616 that abstracts the functionality of the cloud 1614.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium image editing environment, a method implemented by a computing device, the method comprising:
   displaying, by the computing device, a digital image in a user interface including a vector graphic and a raster graphic;
   detecting, by the computing device, a single user input as selecting a region of the digital image including both a portion of the vector graphic and a portion of the raster graphic;
   generating, by the computing device a vector representation of the portion of the vector graphic included in the selected region responsive to the detecting the single user input:
   generating, by the computing device, a raster selection representation of the portion of the raster graphic included in the selected region responsive to detecting the single user input;
   receiving, by the computing device, a second user input specifying a digital image editing operation;
   displaying, by the computing device, a raster-based preview of the digital editing operation as being applied to the portion of the vector graphic in the selected region of the digital image in real time as the second user input is received;
   editing, by the computing device, both the vector selection representation and the raster selection representation using the digital editing operation in response to the second user input, the vector selection representation edited during display of the raster-based preview;
   replacing, by the computing device, the raster-based preview in the digital image with the edited vector selection representation; and
   displaying, by the computing device, the digital image having the edited vector selection representation and the edited raster selection representation.

2. The method as described in claim 1, wherein the vector selection representation defines the portion of the vector graphic using two-dimensional points connected by at least one curve.

3. The method as described in claim 2, wherein the at least one curve is a Bézier curve and the two-dimensional points are control points of the Bézier curve.

4. The method as described in claim 1, wherein the raster selection representation is masked using a gray-scale raster mask and the vector selection representation is masked using a planar map.

5. The method as described in claim 1, wherein the raster selection representation defines the portion of the raster graphic as pixels using a bitmap.

6. The method as described in claim 1, wherein the edited vector selection representation is defined mathematically using two-dimensional points connected by a curve and the edited raster selection representation is defined using a bitmap.

7. The method as described in claim 1, wherein the digital editing operation causes a change to an underlying mathematical structure of the vector selection representation and to pixels of the raster selection representation.

8. The method as described in claim 1, wherein the digital editing operation includes movement of the portion of the vector graphic and the portion of the raster graphic within the digital image.

9. The method as described in claim 1, wherein the digital editing operation includes a masking operation based on the portion of the vector graphic and the portion of the raster graphic within the digital image.

10. The method as described in claim 1, wherein the digital editing operation includes a transformation operation based on the portion of the vector graphic and the portion of the raster graphic within the digital image.

11. The method as described in claim 10, wherein the transformation operation includes resizing, rotation, or color.

12. The method as described in claim 1, further comprising displaying a raster-based preview including initially displaying the vector selection representation as pixels initially as having the digital editing operation applied to the portion of the vector graphic in real time as the second user input is received and wherein the displaying of the edited vector selection representation replaces the initially displayed pixels of the raster-based preview of the vector selection representation.

13. In a digital medium image editing environment, a system comprising:
   means for displaying a digital image in a user interface including a vector graphic and a raster graphic;
   means for detecting a single user input as selecting a region of the digital image including both a portion of the vector graphic and a portion of the raster graphic;
   means for generating a vector selection representation of the portion of the vector graphic included in the selected region responsive to detecting the single user input;
   means for generating a raster selection representation of the portion of the raster graphic included in the selected region responsive to detecting the single user input;
   means for receiving a second user input specifying a digital editing operation;
   means for displaying a raster-based preview of the digital editing operation in real time as being applied to the portion of vector graphic in the selected region of the digital image as the second user input is received;
   means for editing both the vector selection representation and the raster selection representation using the digital editing operation in response to the second user input, the vector selection representation edited during display of the raster-based preview;
   means for replacing the raster-based preview in the digital image with the edited vector selection representation; and
   means for displaying the digital image having the edited vector selection representation and the edited raster selection representation.

14. The system as described in claim 13, wherein the vector selection representation defines the portion of the vector graphic using two-dimensional points connected by at least one curve.

15. The system as described in claim 14, wherein the at least one curve is a Bézier curve and the two-dimensional points are control points of the Bézier curve.

16. The system as described in claim 13, wherein the raster selection representation is masked using a gray-scale raster mask and the vector selection representation is masked using a planar map.

17. The system as described in claim 13, wherein the raster selection representation defines the portion of the raster graphics as pixels using a bitmap.

18. One or more computer-readable storage media having instructions stored thereon that, responsive to execution by a processing system, causes the processing system to perform operations, comprising:
- displaying a digital image in a user interface including a vector graphic and a raster graphic, a dedicated vector layer including the vector graphic, and a dedicated raster layer including the raster graphic;
- receiving a single user input selecting a region of a digital image including both a portion of a vector graphic and a portion of a raster graphic;
- generating a vector selection representation of the portion of the vector graphic included in the selected region and a raster selection representation of the portion of the raster graphic included in the selected region;
- receiving a second user input specifying a digital image editing operation;
- displaying a raster-based preview of the digital editing operation in real time as being applied to the digital image and the dedicated vector layer as the second user input is received;
- editing the vector selection representation and the raster selection representation using the digital editing operation;
- replacing the raster-based preview in the digital image and the dedicated vector layer with the edited vector selection representation; and
- displaying the digital image having the edited vector selection representation as replacing the raster-based preview and the edited raster selection representation, the dedicated vector layer including the edited vector selection representation as replacing the raster-based preview, and the dedicated raster layer including the edited raster selection representation.

19. One or more computer-readable storage media as described in claim 18, wherein the generating is responsive to the receiving of the single user input.

20. One or more computer-readable storage media as described in claim 19, wherein the replacing is performed responsive to completion of the second user input.

* * * * *